Patented June 29, 1954

2,682,513

UNITED STATES PATENT OFFICE 2,682,513

CELLULOSE ESTERS

Irving Skeist, Summit, N. J., assignor to Celanese Corporation of America, New York, N. Y., a corporation of Delaware No Drawing. Application June 6, 1951,
Serial No. 230,246

8 Claims. (Cl. 260—16)

This invention relates to cellulose esters and relates more particularly to cellulose esters copolymerized with other polymerizable materials.

An important object of this invention is to provide cellulose esters having a reduced solubility in common organic solvents and a high resistance to softening at elevated temperatures.

A further object of this invention is to provide a copolymer of a lower aliphatic acid ester of cellulose containing crotonic acid ester groups and a polyhydric alcohol ester of an $\alpha$-$\beta$ unsaturated dicarboxylic acid.

Other objects of this invention will be apparent from the following detailed description and claims.

As is well known, the lower aliphatic acid esters of cellulose exhibit a good solubility in common organic solvents such as acetone, methylene chloride and the like and films cast therefrom will soften at temperatures of the order of about 100° C. which limits their applicability in certain cases. Lower aliphatic acid esters of cellulose containing crotonic acid ester groups, while normally having similar properties with respect to their solubility and softening point as other lower aliphatic acid esters of cellulose, may have their solubility in common organic solvents materially reduced and their melting point substantially raised by heating the said esters for extended periods of time, or otherwise treating the same, to cause a reaction to take place between the crotonic acid radicals, thereby introducing cross-linkages between the cellulose molecules. However, the conditions necessary to produce the cross-linkages are so drastic as to effect a serious degradation of the cellulose molecules which will affect the physical properties of the final products unfavorably.

It has now been discovered that lower aliphatic acid esters of cellulose containing crotonic acid ester groups may be copolymerized with a polyhydric alcohol ester of an $\alpha$-$\beta$ unsaturated dicarboxylic acid to produce cross-linkages between the cellulose molecules under relatively mild conditions which will produce no substantial degradation of the cellulose molecules. The products prepared in this manner exhibit a materially reduced solubility in common organic solvents and a substantially higher melting point thereby expanding their field of use.

In carrying out this invention, the lower aliphatic acid esters of cellulose containing crotonic acid ester groups and the polyhydric alcohol ester of an $\alpha$-$\beta$ unsaturated dicarboxylic acid may be dissolved in a common solvent and the solution so formed employed for the preparation of films or foils or for the production of filamentary materials such as filaments, yarns, tow, ribbon, straw and the like. The lower aliphatic acid esters of cellulose containing crotonic acid ester groups and the polyhydric alcohol ester of an $\alpha$-$\beta$ unsaturated dicarboxylic acid may also be mechanically mixed, in the absence of a solvent or in the presence of a small quantity of solvent, and shaped, by molding, extrusion or the like, into the desired form. Alternatively, the polyhydric alcohol ester of an $\alpha$-$\beta$ unsaturated dicarboxylic acid may be applied to preformed articles having a basis of a lower aliphatic acid ester of cellulose containing crotonic acid ester groups, such as filamentary materials, fabrics and the like, by dipping, padding or spraying, for example. To obtain the best results, there may be employed from about 2 to 20 parts by weight of the polyhydric alcohol ester of an $\alpha$-$\beta$ unsaturated dicarboxylic acid for each 100 parts by weight of the lower aliphatic acid ester of cellulose containing crotonic acid ester groups. The cellulose esters admixed with the polyhydric alcohol ester of an $\alpha$-$\beta$ unsaturated dicarboxylic acid may then be heated to a temperature of between about 60 and 200° C. for a period of between about 1 and 60 minutes, causing a copolymerization to take place and thereby introducing cross-linkages between the cellulose molecules.

Advantageously, the copolymerization of the cellulose esters and the polyhydric alcohol ester of an $\alpha$-$\beta$ unsaturated dicarboxylic acid is effected in the presence of a polymerization catalyst to cause the copolymerization to proceed more rapidly and at reduced temperatures. Suitable polymerization catalysts for this purpose include, for example, tert.-butyl perbenzoate, benzoyl peroxide, cumene hydroperoxide, tert.-butyl hydroperoxide and di-tert.-butyl peroxide. There may be employed from about 0.1 to 5 parts by weight of the polymerization catalyst for each 100 parts by weight of the reactants and the polymerization catalyst is preferably incorporated into the reactants during the mixing of the same.

In preparing the polyhydric alcohol esters of $\alpha$-$\beta$ unsaturated dicarboxylic acids employed in this invention, there may be reacted together, in known manner, a wide variety of polyhydric alcohols and $\alpha$-$\beta$ unsaturated dicarboxylic acids. Examples of suitable polyhydric alcohols include ethylene glycol, diethylene glycol, triethylene glycol, propylene glycol, 1,4-butanediol and glycerol $\alpha$-monochlorhydrin. Examples of suitable $\alpha$-$\beta$ unsaturated dicarboxylic acids include maleic acid, maleic anhydride, fumaric acid, methyl maleic anhydride, and chlor maleic anhydride. Thus, among the suitable polyhydric alcohol esters of $\alpha$-$\beta$ unsaturated dicarboxylic acids there may be mentioned ethylene glycol maleate, ethylene glycol fumarate, diethylene glycol maleate, diethylene glycol fumarate, propylene glycol maleate, 1,4-butanediol fumarate, α-chlor glyceryl methyl maleate and ethylene glycol chlor maleate. The polyhydroxy alcohol esters may also contain some groups of saturated dicarboxylic acids such as succinic, adipic, phthalic and the like whereby the total degree of unsaturation and the degree of cross-linking may be modified.

The lower aliphatic acid esters of cellulose containing crotonic acid ester groups employed in this invention include cellulose acetate crotonate, cellulose propionate crotonate, cellulose butyrate crotonate and the like. These cellulose esters may be prepared in the manner described in Seymour et al. Patents Nos. 2,453,275 and 2,552,820 or in any other desired manner. The cellulose esters may contain from about 0.05 to 1 crotonic acid ester groups per glucose unit and, in addition, from about 0.10 to 0.60 free hydroxyl groups per glucose unit. The compositions produced in accordance with this invention may contain plasticizers, ultra-violet light absorbents, fire retardants and the like, and may have incorporated therein dyes, pigments, nacreous materials and other substances having a decorative effect.

The following examples are given to illustrate this invention further.

*Example I*

To a solution of 100 parts by weight of cellulose acetate crotonate containing 0.8 crotonyl groups and 0.2 free hydroxyl groups for each glucose unit in a mixture of 250 parts by weight of acetone and 400 parts by weight of benzol there is added 10 parts by weight of diethylene glycol maleate and 0.1 part by weight of tert.-butyl perbenzoate. The solution is cast to produce a film which is dried and then heated for 5 minutes at a temperature of 150° C. There is obtained a clear film which is insoluble in acetone and exhibits a high resistance to softening at temperatures as high as 150° C.

*Example II*

To a solution of 100 parts by weight of cellulose acetate crotonate containing 0.3 crotonyl groups and 0.3 free hydroxyl groups per glucose unit in a mixture of 250 parts by weight of acetone and 400 parts by weight of benzol there is added 10 parts by weight of diethylene glycol maleate and 0.1 part by weight of tert.-butyl perbenzoate. The solution is cast to form a film which is dried and then heated for 5 minutes at a temperature of 150° C. There is obtained a clear film which is insoluble in acetone and exhibits a high resistance to softening at temperatures as high as 150° C.

It is to be understood that the foregoing detailed description is given merely by way of illustration and that many variations may be made therein without departing from the spirit of my invention.

Having described my invention, what I desire to secure by Letters Patent is:

1. Process for preparing cellulose esters, which comprises heating a cellulose ester of a saturated lower aliphatic acid, containing from about 0.05 to 1 crotonic acid ester groups and from about 0.10 to 0.60 free hydroxyl groups for each glucose unit, with an ester of an α-β unsaturated dicarboxylic acid and a glycol, at a temperature of between 60 and 200° C. for a period of between 1 and 60 minutes.

2. Process for preparing cellulose esters, which comprises heating in the presence of a polymerization catalyst a cellulose ester of a saturated lower aliphatic acid, containing from about 0.05 to 1 crotonic acid ester groups and from about 0.10 to 0.60 free hydroxyl groups for each glucose unit, with an ester of an α-β unsaturated dicarboxylic acid and a glycol, at a temperature of between 60 and 200° C. for a period of between 1 and 60 minutes.

3. Process for preparing cellulose esters, which comprises heating cellulose acetate crotonate containing from about 0.05 to 1 crotonyl groups and from about 0.10 to 0.60 free hydroxyl groups for each glucose unit, with an ester of an α-β unsaturated dicarboxylic acid and a glycol, at a temperature of between 60 and 200° C. for a period of between 1 and 60 minutes.

4. Process for preparing cellulose esters, which comprises heating in the presence of a polymerization catalyst cellulose acetate crotonate containing from about 0.05 to 1 crontonyl groups and from about 0.10 to 0.60 free hydroxyl groups for each glucose unit, with an ester of an α-β unsaturated dicarboxylic acid and a glycol, at a temperature of between 60 and 200° C. for a period of between 1 and 60 minutes.

5. Process for preparing cellulose esters, which comprises heating cellulose acetate crotonate containing from about 0.05 to 1 crotonyl groups and from about 0.10 to 0.60 free hydroxyl groups per glucose unit, with from about 2 to 20 parts by weight of an ester of an α-β unsaturated dicarboxylic acid and a glycol for each 100 parts by weight of the cellulose acetate crotonate, in the presence of from about 0.1 to 5 parts by weight in the presence of a polymerization catalyst for each 100 parts by weight of the reactants, at a temperature of between 60 and 200° C. for a period of between 1 and 60 minutes.

6. Process for preparing an interpolymer in pellicular form, which comprises forming a solution of cellulose acetate crotonate containing from about 0.5 to 1 crotonyl groups and from 0.10 to 0.60 free hydroxyl groups per glucose unit, from about 2 to 20 parts by weight of an ester of an α-β unsaturated dicarboxylic acid and a glycol for each 100 parts by weight of the cellulose acetate crotonate and from about 0.1 to 5 parts by weight of a polymerization catalyst for each 100 parts by weight of the reactants, forming a film from said solution, drying said film and then heating said film for 5 minutes at a temperature of 150° C.

7. A polymerization composition comprising a cellulose ester of a saturated lower aliphatic acid, containing from about 0.05 to 1 crotonic acid ester groups and from about 0.10 to 0.60 free hydroxyl groups for each glucose unit, an ester of an α-β unsaturated dicarboxylic acid and a glycol, and a polymerization catalyst.

8. A polymerization composition comprising cellulose acetate crotonate containing from 0.05 to 1 crotonyl groups and from 0.10 to 0.60 free hydroxyl groups per glucose unit, from about 2 to 20 parts by weight of an ester of an α-β unsaturated dicarboxylic acid and a glycol for each 100 parts by weight of the cellulose acetate crotonate, and from about 0.1 to 5 parts by weight of a polymerization catalyst for each 100 parts by weight of the reactants.

References Cited in the file of this patent

UNITED STATES PATENTS

| Number | Name | Date |
| --- | --- | --- |
| 2,336,985 | Freund | Dec. 14, 1943 |
| 2,409,633 | Kropa | Oct. 22, 1946 |